(12) United States Patent
Park et al.

(10) Patent No.: US 7,183,937 B2
(45) Date of Patent: Feb. 27, 2007

(54) SELF-POWERED SENSING MODULE AND TIRE PRESSURE MONITORING SYSTEM USING THE SAME

(75) Inventors: Tae-sik Park, Suwon-si (KR); Jung-ho Kang, Suwon-si (KR); Jong-hwa Won, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 104 days.

(21) Appl. No.: 10/998,578

(22) Filed: Nov. 30, 2004

(65) Prior Publication Data

US 2005/0134444 A1    Jun. 23, 2005

(30) Foreign Application Priority Data

Dec. 22, 2003  (KR) ...................... 10-2003-0094448

(51) Int. Cl.
*G08B 23/00* (2006.01)

(52) U.S. Cl. .................... 340/693.1; 340/445; 340/447; 73/146; 116/34 R; 152/152.1

(58) Field of Classification Search ............ 340/445–8, 340/693.1, 693.4; 73/146; 116/34 A, 34 B, 116/34 R; 152/152.1; 310/311, 338, 339

See application file for complete search history.

(56) References Cited

U.S. PATENT DOCUMENTS

| 4,300,119 A | 11/1981 | Wiernicki et al. |
| 6,438,193 B1 | 8/2002 | Ko et al. |
| 6,725,713 B2 * | 4/2004 | Adamson et al. .......... 73/146.5 |
| 2003/0209064 A1 | 11/2003 | Adamson et al. |

FOREIGN PATENT DOCUMENTS

JP    2002-0073326 A    9/2002

* cited by examiner

*Primary Examiner*—Jeffery Hofsass
*Assistant Examiner*—Hongmin Fan
(74) *Attorney, Agent, or Firm*—Sughrue Mion, PLLC

(57) ABSTRACT

A tire pressure monitoring system (TPMS) having a self-powered sensing module having a sensor unit with at least one sensor for measuring at least one of a temperature, a pressure, and an acceleration in the tire, and a power unit generating a power by being deformed mechanically according to a rotation of the tire and supplying the sensor with a power required for actuating the sensor. The self-powered sensing module and the TPMS using the same are powered by the power unit generating the power owing to the mechanical deformation, without using a separate power supply. Hence, there is no need to replace a battery of the sensing module and maintenance costs are reduced.

22 Claims, 8 Drawing Sheets

SELF-POWERED SENSING MODULE AND TIRE PRESSURE MONITORING SYSTEM USING THE SAME

CROSS-REFERENCE TO RELATED APPLICATIONS

This application claims the benefit of Korean Patent Application No. 2003-94448 filed on Dec. 22, 2003 in the Korean Intellectual Property Office, the disclosure of which is incorporated herein by reference in its entirety.

BACKGROUND OF THE INVENTION

1. Field of the Invention

The present invention concerns a self-powered sensing module capable of operating without having to use separate power supplied externally and a tire pressure monitoring system using the sensing module.

2. Description of the Related Art

A tire for a wheeled vehicle generally transfers driving power, brake power, and lateral force of the vehicle onto a road while supporting the load of the vehicle against the road, and also serves as a spring and a damper for absorbing shock and impact with respect to the road.

If a tire pressure is above a suitable range, the vehicle tramps over the road to cause ride discomfort and acceleration of the abrasion of the tire. If the tire pressure is below the suitable range, acceleration of the abrasion of the tire occurs as well and this condition may also bring about a traffic accident due to a puncture occurring to the tire during driving. In addition, the driving of the vehicle deteriorates and fuel efficiency decreases. Accordingly, it is essential to maintain the suitable tire pressure.

To address the above issues, a tire pressure monitoring system (TPMS) is under development so as to enable a vehicle operator to monitor the physical state, such as tire pressure and temperature, through a display.

Figure 1:
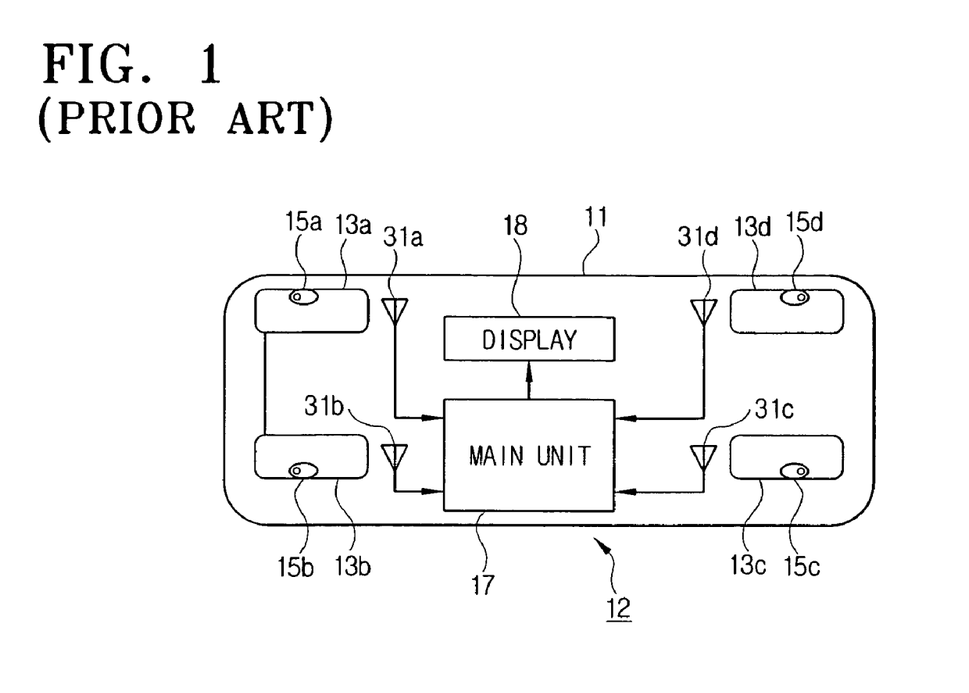
FIG. 1 is a schematic of a conventional tire pressure monitoring system (TPMS)

FIG. 1 depicts an example of a conventional TPMS 12. The TPMS 12 includes four pressure sensing modules 15a, 15b, 15c and 15d and a main unit 17.

The pressure sensing modules 15a, 15b, 15c and 15d are mounted in tires 13a, 13b, 13c and 13d, respectively. The main unit 17 is secured in a body of a vehicle 11.

Figure 2:
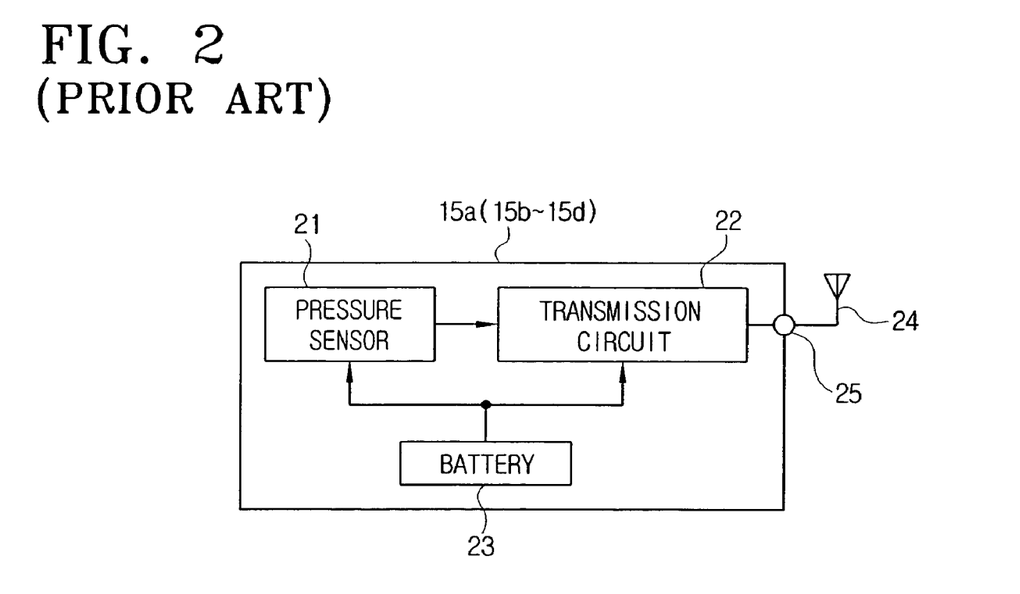
FIG. 2 is a circuit block diagram of the pressure sensing module of the TPMS of FIG. 1.

Referring now to FIG. 2, each of the pressure sensing modules 15a, 15b, 15c and 15d includes a pressure sensor 21, a transmission circuit 22, a battery 23, and a transmission antenna 24.

The battery 23 may be a lithium battery and supplies power to the pressure sensor 21 and the transmission circuit 22. The transmission antenna 24 irradiates a radio wave within a radius of the tire 13a, 13b, 13c or 13d. The pressure sensor 21 communicates with the transmission circuit 22 which is connected to the transmission antenna 24 through an output terminal 25.

The pressure sensor 21 detects the pressure in the tire 13a, 13b, 13c or 13d and transmits to the transmission circuit 22 a signal carrying information on the detected pressure.

The transmission circuit 22 is provided with an internal memory (not shown) storing a unique identification (ID) code. The ID code is to identify the pressure sensing modules 15a, 15b, 15c and 15d mounted in the vehicle 11 from each other. The transmission circuit 22 performs modulation in order to generate a signal carrying data indicating the pressure information and the ID code, and transmits the modulated signal as the radio wave over the transmission antenna 24.

Figure 3:
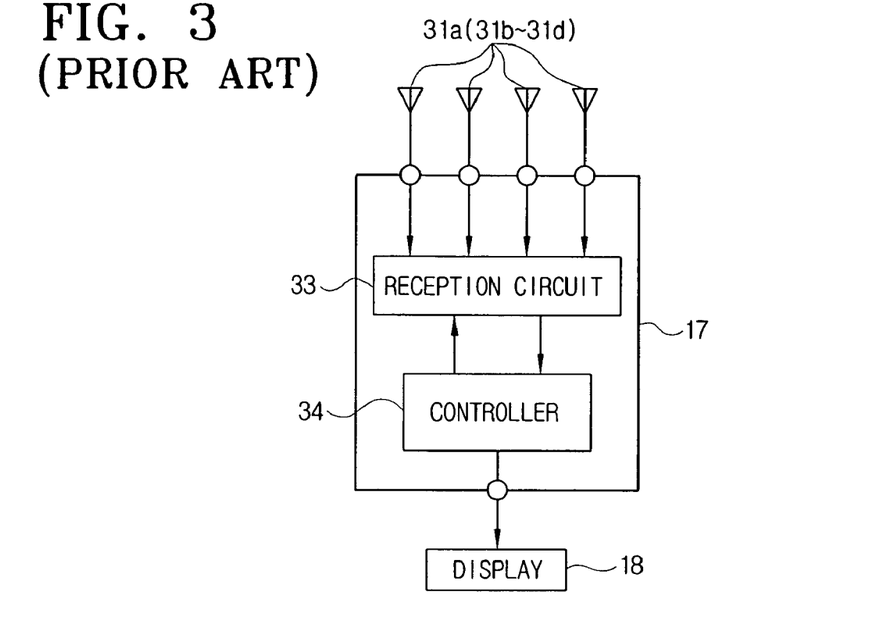
FIG. 3 is a circuit block diagram of the main unit of the TPMS of FIG. 1.

Referring to FIG. 3, the main unit 17 includes four reception antennae 31a, 31b, 31c and 31d, a reception circuit 33, a controller 34, and a display 18.

The reception circuit 33 receives via the reception antennae 31a, 31b, 31c and 31d the radio wave from the transmission antenna 24 of the pressure sensing modules 15a, 15b, 15c and 15d. The reception circuit 33 detects and demodulates the radio wave carrying the pressure data, and transfers the demodulated data to the controller 24.

The controller 34 controls the display 18 to display information on the tire pressure based on the received data.

The display 18 is mounted at a cockpit and is connected with the controller 34.

However, the conventional TPMS 12 has a disadvantage that the vehicle operator needs to replace the battery 23 by separating each of the tires 13a, 13b, 13c and 13d when the battery 23 is run down for supplying the power to the pressure sensor 21 of the pressure sensing module 15a, 15b, 15c or 15d and the transmission circuit 22. This is because the pressure sensing modules 15a, 15b, 15c and 15d are mounted in the tires 13a, 13b, 13c and 13d, respectively.

Since the lithium battery 23 is expensive, it costs a lot to maintain the TPMS 12. In addition, the pressure sensing modules 15a, 15b, 15c and 15d, which are mounted in the tires 13a, 13b, 13c and 13d, increase in volume due to the size of the lithium battery 23.

To overcome the above disadvantage, there is provided another TPMS (not shown) which estimates the pressure of the tire by measuring elasticity of the tire from the suspension of the vehicle, instead of measuring the pressure in the tires 13a, 13b, 13c and 13d.

Such a TPMS overcomes the above disadvantage of separating the tires in order to replay the battery. However, the TPMS has a drawback that it is hard to obtain accurate tire pressure since the tire pressure is estimated based on the elasticity of the tires.

SUMMARY OF THE INVENTION

To address the above disadvantages and problems of the above conventional arrangement, an exemplary aspect of the present invention provides a self-powered sensing module and a tire pressure monitoring system (TPMS) having the same, which are powered by a power unit generating the power owing to the mechanical deformation, without using the separate power supply. Accordingly, there is no need to replace the battery of the sensing module and maintenance costs are reduced.

To achieve the above aspect and feature of the present invention, the TPMS comprises a self-powered sensing module disposed in each tire to be deformed according to the revolution of the tire, comprising a sensor unit having at least one sensor for measuring at least one of a temperature, a pressure, and acceleration of the tires, a power unit generating a power by deforming mechanically according to a revolution of the tires and supplying the sensor with a power for actuation, and a transmitter unit transmitting data detected by the sensor; and a main unit disposed in the vehicle and comprising a receiver unit receiving the data transmitted from the transmitter unit and a monitoring unit displaying the received data to a vehicle operator.

The power unit comprises a power generator generating the power by mechanically deforming by the tires; and a power converter converting the power generated in the power generator to a power required for the sensor and the transmitter unit.

The power generator is a piezoelectric generator which uses the direct piezoelectric effect of a piezoelectric material which generates voltage when bent or when stress is given. The piezoelectric generator comprises piezoelectric thin film first and second electrodes formed on and below the piezoelectric thin film to face each other, and a flexible cover member attached on an outer surface of one of the first and second electrodes for flexibly supporting and protecting the piezoelectric thin film. The piezoelectric thin film comprises a plurality of first and second piezoelectric elements disposed at certain intervals in alternation and polarized into an anode and a cathode; and a plurality of piezoelectric pads disposed between the first and second piezoelectric elements and separating the first and second piezoelectric elements from each other.

The power converter comprises an AC/DC converter converting alternate current (AC) generated in the power generator to direct current (DC); and a DC/DC converter converting the DC converted in the AC/DC converter to the power required for the sensor and the transmitter unit.

The transmitter unit comprises a transmission control unit amplifying a sensing signal output from the sensor to a certain level and outputting the amplified signal in a predetermined format at predetermined intervals; and a transmission output unit transmitting the data signal output from the transmission controller to the outside.

The transmission controller comprises a sensing signal amplifier amplifying the sensing signal output from the sensor to the certain level; an analog-to-digital (A/D) converter converting an amplified analog signal of the sensing signal amplifier to a digital signal; and a transmission controller receiving the digital signal output from the A/D converter and outputting the received signal together with an identification (ID) code of the individual tire and the individual sensor in the predetermined data format at the predetermined time intervals.

The transmission output unit comprises a frequency generator generating a predetermined carrier frequency; and a radio frequency (RF) generator modulating the data signal output from the transmission controller and emitting the modulated signal as a radio wave through a transmission antenna.

The receiver unit comprises a reception amplifier amplifying the data signal transmitted from the transmitter unit in the predetermined data format, to a certain level; and a detector demodulating or detecting the data signal amplified in the reception amplifier and outputting the demodulated or detected signal.

The monitoring unit comprises a main controller receiving the detected signal from the detector, confirming a corresponding tire and sensor by comparing the received signal with a pre-input ID code signal of the individual tire and the individual sensor, and controlling to display a confirmation result; and a display displaying the confirmation result according to a control signal of the main controller.

The main controller compares the data of the confirmed sensor with a pre-input specified data of the sensor and controls to generate an alarm signal if the comparison result is out of an allowable range. The monitoring unit further comprises a speaker for generating an alarm according to the alarm signal of the main controller.

The self-powered sensing module is disposed on an inner bottom of the tire. The self-powered sensing module further comprises an elastic fixing member facilitating attachment onto an inner bottom of the tire.

Consistent with aspect of the present invention, the self-powered sensing module comprises a sensor unit having at least one sensor for measuring at least one of a temperature, a pressure, and an acceleration of an object to be measured; and a power unit generating a power by deforming mechanically according to an operation of the object and supplying the sensor with a power required for actuating the sensor.

The power unit comprises a power generator generating the power by being mechanically deformed by the object; and a power converter converting the power generated in the power generator to a power required for the sensor.

The power generator comprises a piezoelectric generator. The piezoelectric generator comprises a piezoelectric thin film; first and second electrodes formed on and below the piezoelectric thin film to face each other; and a flexible cover member attached on an outer surface of at least one of the first and second electrodes for flexibly supporting and protecting the piezoelectric thin film. The piezoelectric thin film comprises a plurality of first and second piezoelectric elements disposed at certain intervals in alternation and polarized into an anode and a cathode; and a plurality of piezoelectric pads disposed between the first and second piezoelectric elements and separating the first and second piezoelectric elements from each other.

The power converter comprises an AC/DC converter converting alternate current (AC) generated in the power generator to direct current (DC); and a DC/DC converter converting the DC converted in the AC/DC converter to the power required for the sensor.

The self-powered sensing module further comprises a transmitter unit transmitting data measured by the sensor of the sensor unit to the outside.

The transmitter unit comprises a transmission control unit amplifying a sensing signal output from the sensor to a certain level and outputting the amplified signal in a predetermined format at predetermined intervals; and a transmission output unit transmitting the data signal output from the transmission controller to the outside.

The transmission control unit comprises a sensing signal amplifier amplifying the sensing signal output from the sensor to the certain level; an analog-to-digital (A/D) converter converting an amplified analog signal of the sensing signal amplifier to a digital signal; and a transmission controller receiving the digital signal output from the A/D converter and outputting the received signal together with an identification (ID) code of the individual tire and the individual sensor in the predetermined data format at the predetermined time intervals.

The transmission output unit comprises a frequency generator generating a predetermined carrier frequency; and a radio frequency (RF) generator modulating the data signal output from the transmission controller and emitting the modulated signal as a radio wave through a transmission antenna.

The object measured by the sensor is a tire for a vehicle, and the self-powered sensing module is disposed on an inner bottom of the tire.

BRIEF DESCRIPTION OF THE DRAWING FIGURES

These and/or other aspects and advantages of the invention will become apparent and more readily appreciated from the following description of exemplary embodiments, taken in conjunction with the accompanying drawing figures of which.

DETAILED DESCRIPTION OF EXEMPLARY EMBODIMENTS

Reference will now be made in detail to exemplary, non-limiting embodiments of the present invention, examples of which are illustrated in the accompanying drawings, wherein like reference numerals refer to like elements throughout. The embodiments are described below in order to explain the present invention by referring to the drawings.

Figure 4:
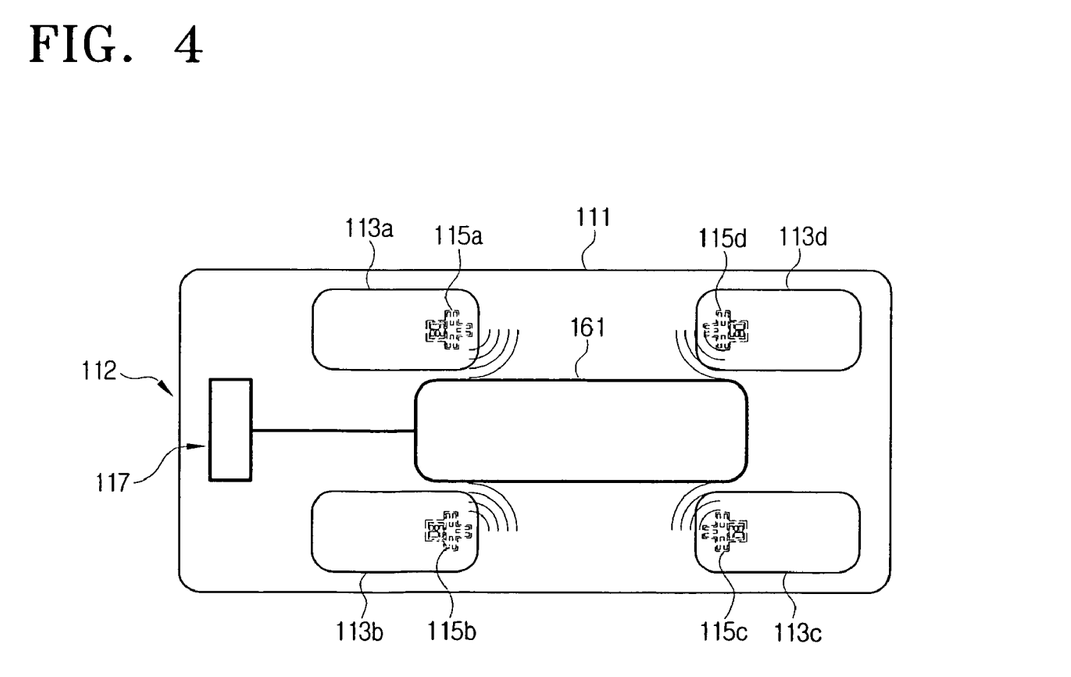
FIG. 4 is a schematic of a TPMS employing a self-powered sensing module according to an exemplary embodiment of the present invention.

FIG. 4 is a schematic illustrating a tire pressure monitoring system (TPMS) employing self-powered sensing modules for a wheeled vehicle according to an exemplary embodiment of the present invention.

The TPMS 112 includes four self-powered sensing module 115a, 115b, 115c and 115d installed in four tires 113a, 113b, 113c and 113d, respectively, and a main unit 117 installed in a vehicle body 111.

Figure 5:
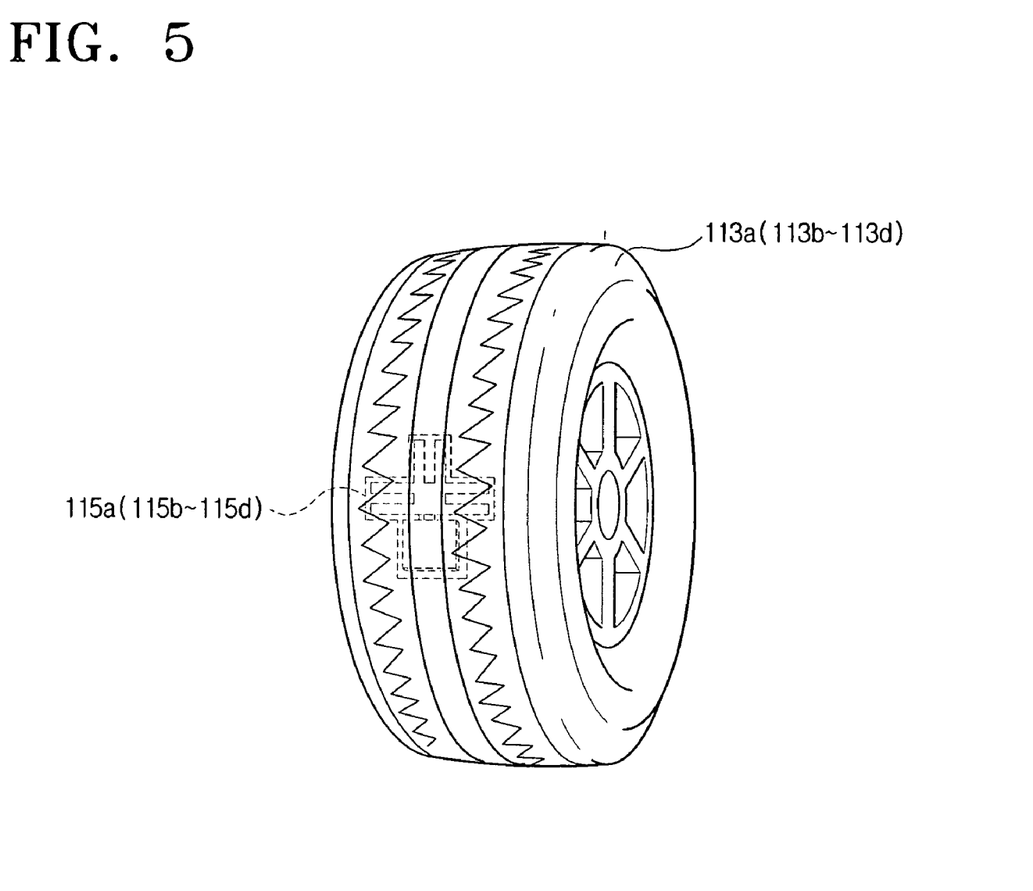
FIG. 5 is a perspective view of the self-powered sensing module of FIG. 4, which is attached on a tire.

Referring to FIG. 5, the self-powered sensing modules 115a, 115b, 115c and 115d are installed on an inner bottom 172 (FIGS. 7B and 7C) of the tires 113a, 113b, 113c and 113d, respectively, in order to protect from damage due to shock against a road 170.

Figure 6:
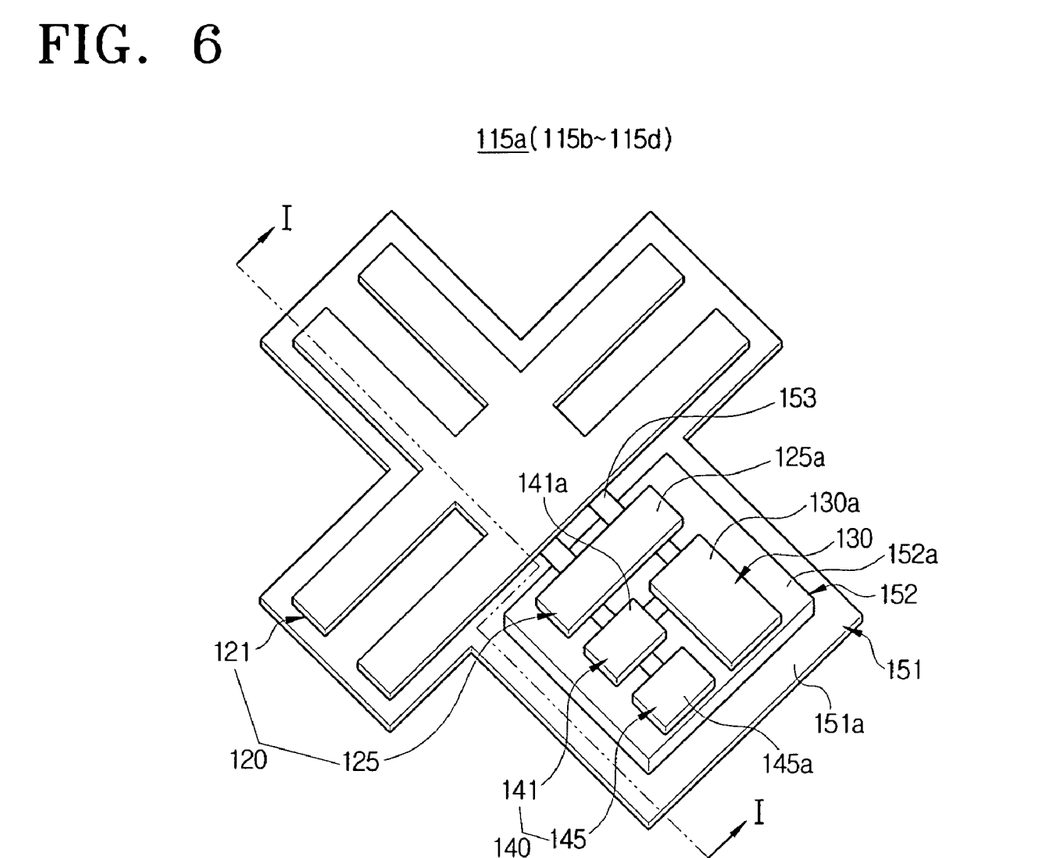
FIG. 6 is perspective view of the self-powered sensing module of FIG. 5.

Referring to FIG. 6, each of the powered sensing modules 115a, 115b, 115c and 115d includes an elastic fixing member 151, a sensor unit 130, a power unit 120, and a transmitter unit 140. The elastic fixing member 151 is attached onto the inner bottom 172 of the tires 113a, 113b, 113c and 113d and formed with a rubber material. The sensor unit 130 is mounted on a board 152 attached onto an inner side 151a of the elastic fixing member 151, and includes a pressure sensor 131, a temperature sensor 133, and an acceleration sensor 135 (FIG. 8) for measuring pressure, temperature, and acceleration within the tires 113a, 113b, 113c and 113d. The power unit 120 is mounted on the inner side 151a of the elastic fixing member 151 and on an inner side 152a of the board 152, and generates power by being deformed mechanically by the tires 113a, 113b, 113c and 113d while the tires 113a, 113b, 113c and 113d revolve, and supplies the sensors 131, 133 and 135 with the power required for operating the sensors 131, 133 and 135 of the sensor unit 130. The transmitter unit 140 is mounted on the inner side 152a of the board 152 and transmits data detected by the sensors 131, 133 and 135 to the outside.

The sensor unit 130 is configured with a single circuit board (not shown) on which the pressure sensor 131, the temperature sensor 133, and the acceleration sensor 135 are systemized and mounted, or an integrated sensor by implementing the pressure sensor 131, and the temperature sensor 133 and the acceleration sensor 135 as a single chip by use of MEMS (Micro Electro Mechanical System).

The circuit board or the integrated sensor forming the sensor unit 130 is sealed by a sensor casing 130a to protect it from external shock and impact.

The power unit 120 includes a power generator 121 and a power conversion unit 125. The power generator 121 is attached onto the inner side 151a of the elastic fixing member 151, and generates power by deforming mechanically according to the corresponding tires 113a, 113b, 113c and 113d. The power conversion unit 125 is disposed on the inner side 152a of the board 152, and converts the power generated in the power generator 121 to a power required for the pressure sensor 131, the temperature sensor 133, and the acceleration sensor 135 of the sensor unit 130, and a transmission controller 143 and a frequency generator 146 of the transmitter unit 140, which will be explained below.

Figure 7A:
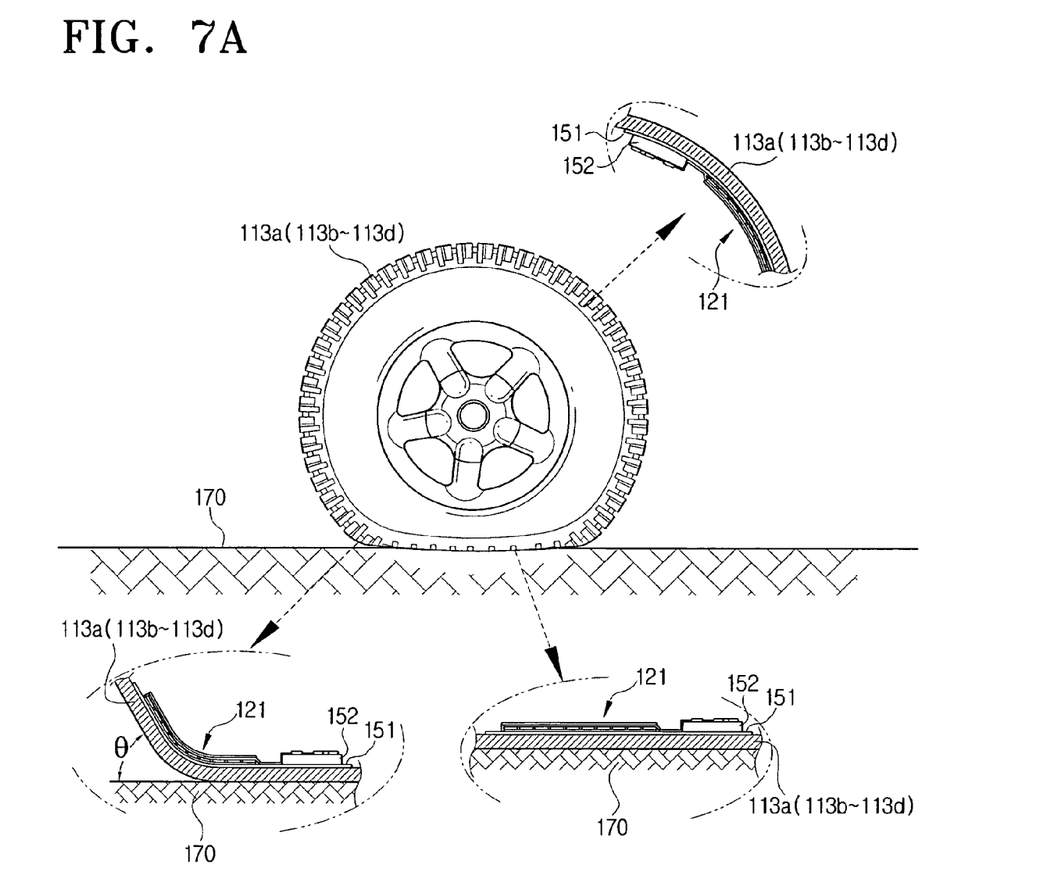
FIG. 7A is a side view illustrating an operation of the self-powered sensing module of FIG. 5.
Figure 7B:
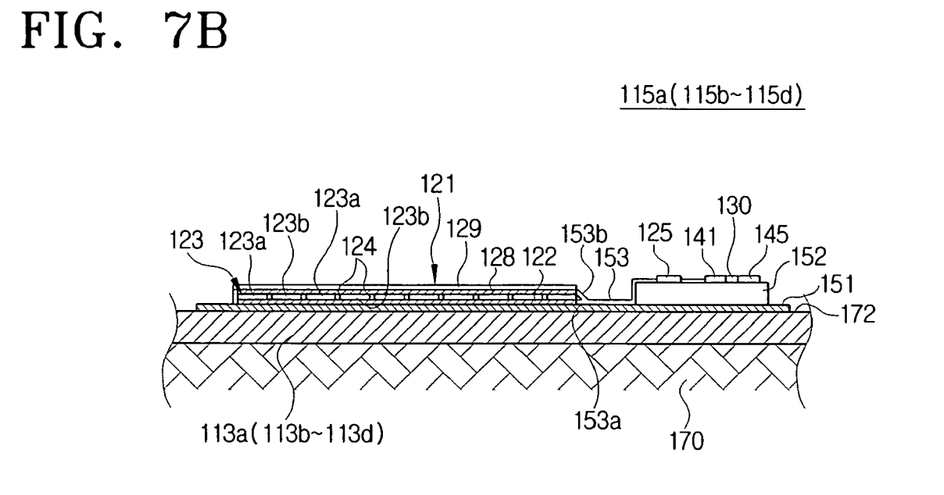
FIG. 7B is a local section view illustrating the operation of the self-powered sensing module of FIG. 5.

Referring to FIG. 7B, the power generator 121 is a piezoelectric generator using direct piezoelectric effect of a piezoelectric material which generates voltage when bent or when stress is applied.

Figure 7C:
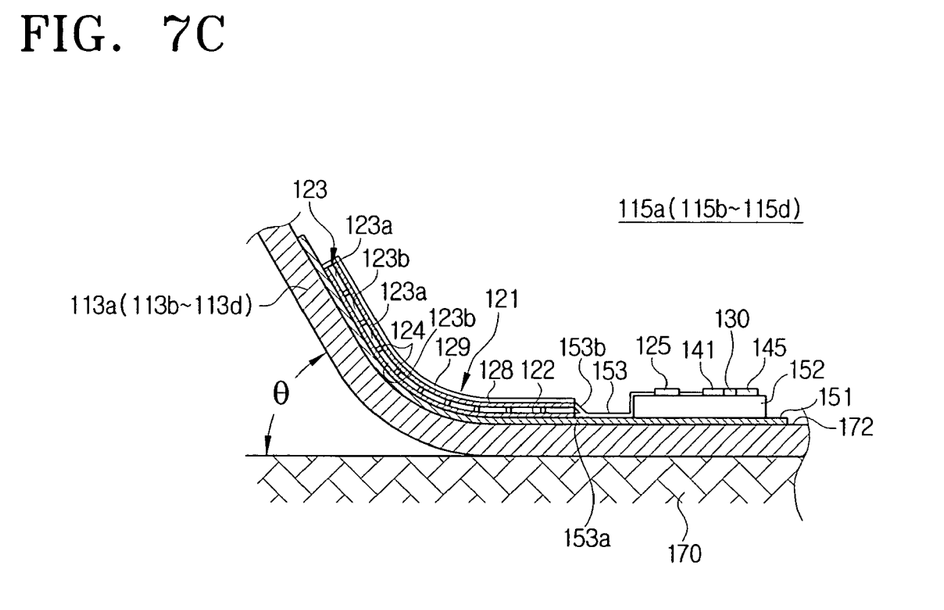
FIG. 7C is a local section view illustrating the operation of the self-powered sensing module of FIG. 5.

The piezoelectric generator is in an overlapped H-shaped form, as shown in FIGS. 7B and 7C, in order to effectively react to the given bending or stress, and includes a piezoelectric thin film 123, first and second electrode plates 122 and 128, and a flexible cover member 129. The electronic thin film 123 is formed in thickness of 0.5–2.0 μm by use of the piezoelectric material such as Zno, $PZT(Pb(ZrTi)O_3)$ and $PLZT((PbLa)(ZrTi)O_3)$. The first and second electrode plates 122 and 128 respectively form an anode and a cathode, and are formed in thickness of 0.1–1.0 μm by use of a metal such as Pt, Ta, and Pt—Ta facing each other on and below the piezoelectric thin film 123. The flexible cover member 129 is attached onto an outer surface of the second electrode plate 128 for protecting the piezoelectric thin film 123.

The piezoelectric thin film 123 includes a plurality of first and second piezoelectric elements 123a and 123b polarizing into an anode and a cathode. The first and second piezoelectric elements 123a and 123b are disposed at certain intervals in alternation, and a plurality of piezoelectric pads 124 are disposed between the first and second piezoelectric elements 123a and 123b for separating from the first and second piezoelectric elements 123a and 123b.

Referring to FIG. 7A, when the tires 113a, 113b, 113c and 113d rotate, the piezoelectric thin film 123 (shown in FIGS. 7B, 7C) of the power generator 121, which are attached onto the inner bottom 172 of tires 113a, 113b, 113c and 113d through the elastic fixing member 151, is pressed and deformed. Then, the deformed first and second piezoelectric elements 123a and 123b generate electromotive force of the plus and minus polarities in alternation.

The electromotive force of the plus and minus polarities, which is generated in the first and second piezoelectric elements 123a and 123b, is applied to the power conversion unit 125 through first and second connection terminals 153a and 153b connected to the first and second electrode plates 122 and 128, and a wire 153.

Figure 8:
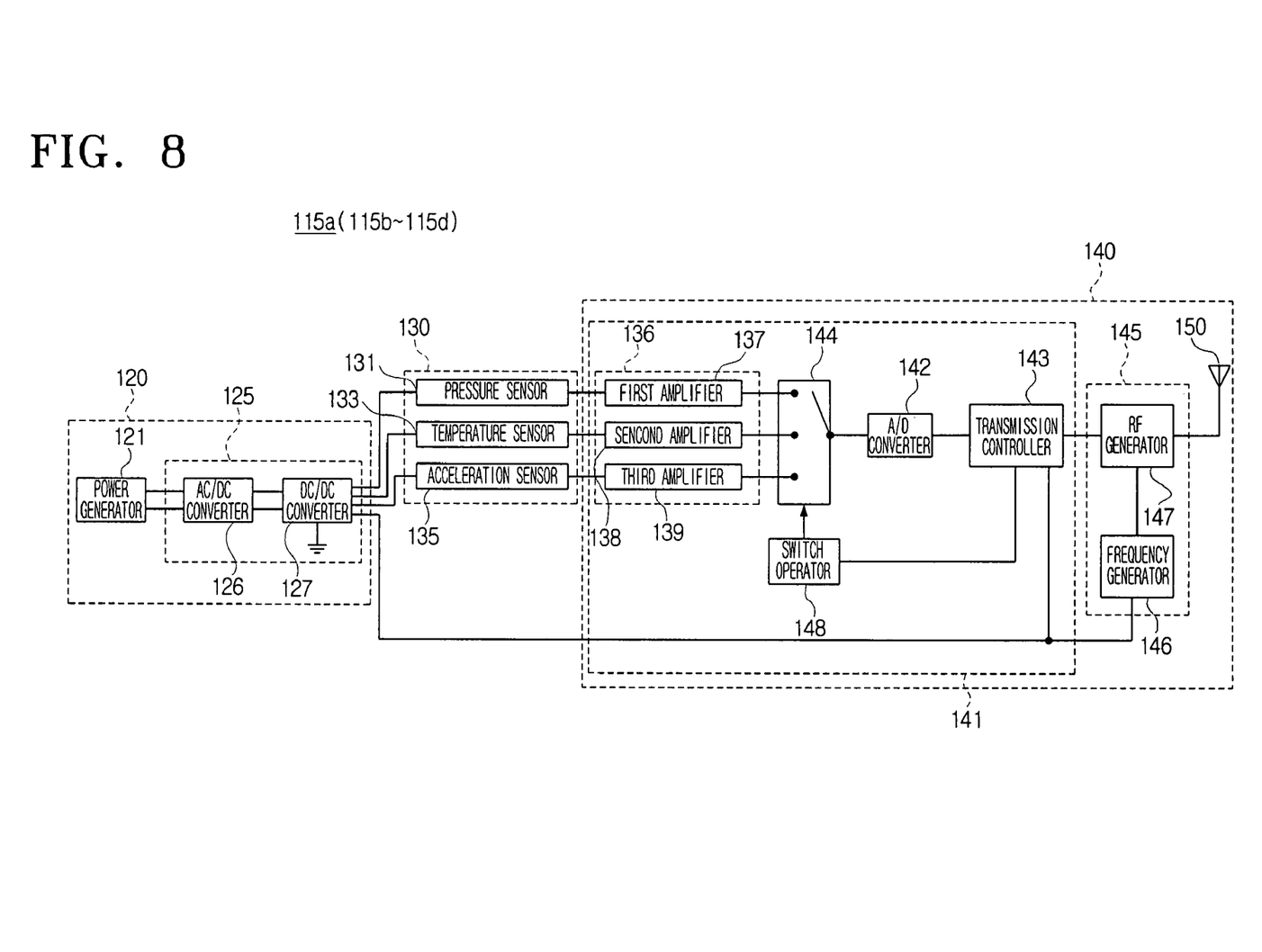
FIG. 8 is a circuit block diagram of the self-powered sensing module of the TPMS of FIG. 4.

Referring to FIG. 8, the power conversion unit 125 includes an AC/DC converter 126 and a DC/DC converter 127. The AC/DC converter 126 converts alternating current (AC) voltage generated in the power generator 121 to direct current (DC) voltage. The DC/DC converter 127 converts the DC voltage converted in the AC/DC converter 126 to the voltage required for the parts of the self-powered sensing modules 115a, 115b, 115c and 115d, specifically, required for the pressure sensor 131, the temperature sensor 133 and the acceleration sensor 135 of the sensor unit 130, the transmission controller 143 and the frequency generator 146 of the transmitter unit 140.

The voltage converted by the DC/DC converter 127 is supplied directly to the parts of the self-powered sensing modules 115a, 115b, 115c and 115d in this exemplary embodiment, but not by way of limitation. The converted voltage may be stored in a storage battery (not shown) and then supplied to the parts of the self-powered sensing modules 115a, 115b, 115c and 115d in order to operate the self-powered sensing modules 115a, 115b, 115c and 115d even when the vehicle stands still.

The power converter 125, like the circuit board or the integrated sensor of the sensor unit 130, is sealed by a power converter casing 125a to protect from external shock and impact.

The transmitter unit 140 includes a transmission control unit 141 and a transmission output unit 145. The transmission control unit 141 amplifies voltages output from the pressure sensor 131, the temperature sensor 133 and the acceleration sensor 135, that is, amplifies sensing signals to a certain level and outputs the amplified signals in sequence at predetermined time intervals and in a predetermined format. The transmission output unit 145 transmits a data signal output from the transmission control unit 141 to an output side.

The transmission control unit 141 includes a sensing signal amplifier 136, a switch 144, an analog-to-digital (A/D) converter 142, and the transmission controller 143. The sensing signal amplifier 136 includes first, second and third amplifiers 137, 138 and 139 amplifying sensing signals output from the pressure sensor 131, and the temperature sensor 133 and the acceleration sensor 135 to a certain level. The switch 144 selectively outputs the sensing signals amplified in the first, second and third amplifiers 137, 138 and 139. The A/D converter 142 converts the analog signal selectively output from the switch 144 to a digital signal. The transmission controller 143 controls a switch operator 148 for the switch 144 to selectively output the sensing signals at predetermined time intervals, and receives and outputs the digital signal output from the A/D converter 142 together with the ID code, which is input in advance and identifies the tires 113a, 113b, 113c and 113d and the signals of the sensors 131, 133 and 135, in a predetermined data format.

The transmission controller 143 is provided with a first internal memory (not shown) storing the ID code and the data format.

The transmission controller 143 outputs first, second and third switching actuating signals at predetermined time intervals to the switch operator 148 so as to control to selectively output the sensing signals. The switch operator 148 actuates the switch 144 by generating a switching signal at predetermined time intervals according to the first, second and third switching actuating signals.

Figure 9:
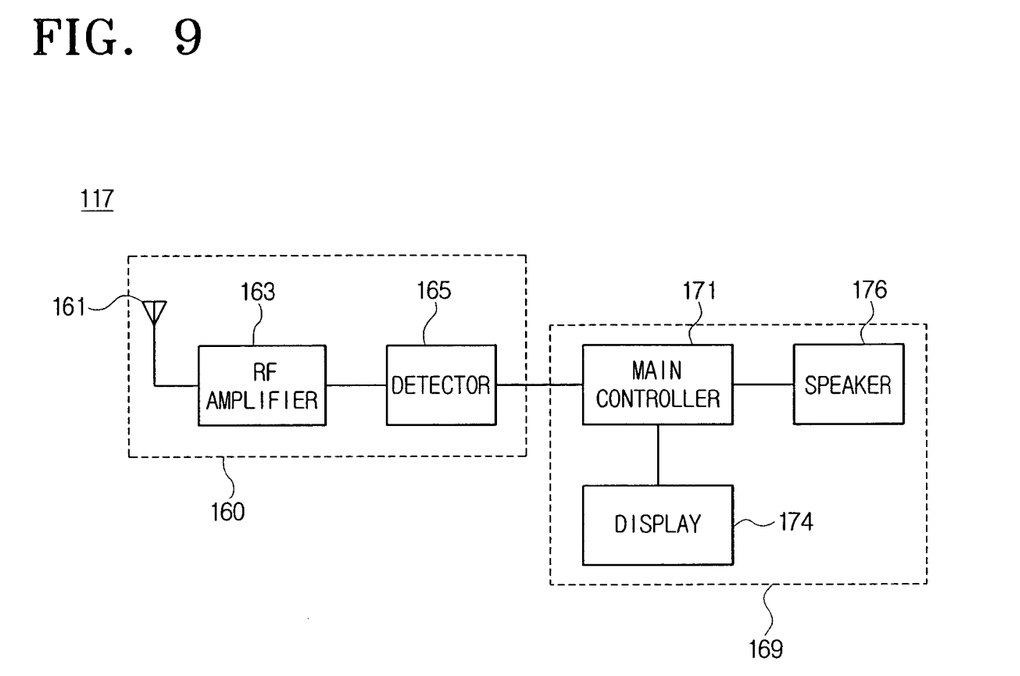
FIG. 9 is a circuit block diagram of the main unit of the TPMS of FIG. 4.

It is advantageous to set the time intervals of the generation of the first, second and third switching actuating signals in the transmission controller 143 so as to separately transmit to a receiver unit 160 the sensing signals of the sensors 131, 133 and 135 of the individual self-powered sensing module 115a, 115b, 115c and 115d mounted in the tires 113a, 113b, 113c and 113d. If the sensing signals are transmitted to the receiver unit 160 at the same time, the receiver unit 160 needs to have a reception antenna respectively for the each of the self-powered sensing modules 115a, 115b, 115c and 115d to receive the sensing signals. In addition, the receiver unit 160 needs to have additional switch and switch operator for selectively receiving the sensing signals.

It is possible to transmit the sensing signals of the sensors 131, 133 and 135 to the receiver unit 16 at the same time. Then, the receiver unit 160 may include four reception antennae for receiving the sensing signals, and additional switch and switch operator for selectively receiving the sensing signals.

The transmission output unit 145 includes the frequency generator 146 generating a predetermined carrier frequency and a radio frequency (RF) generator 147 modulating the data signal output in the predetermined data format from the transmission controller 143 and emitting the modulated signal as the radio wave via a transmission antenna 150.

The transmission control unit 141 and the transmission output unit 145 are sealed in a transmission control unit casing 141a and a transmission output unit casing 145a, respectively, and therefore, protected from external shock and impact.

Referring to FIG. 9, the main unit 117 of the TPMS 112, which is mounted in the vehicle body 111, includes the receiver unit 160 and a monitoring unit 169. The receiver unit 160 receives the radio wave emitted from the RF generator 147 of the transmitter unit 140. The monitoring unit 169 detects and demodulates the radio wave received by the receiver unit 160 and displays to the vehicle operator the corresponding tires 113a, 113b, 113c and 113d and the sensing data of the sensors 113, 133 and 135.

The receiver unit 160 includes a reception antenna 161 disposed in the vehicle body 111 and receiving the radio wave emitted from the RF generator 147 of the transmitter unit 140 through the transmission antenna 150, a RF amplifier 163 amplifying the radio wave received to the reception antenna 161 to a certain level, and a detector 165 demodulating or detecting and outputting the amplified signal of the RF amplifier 163.

The monitoring unit 169 includes a main controller 171, a display 174, and a speaker 176. The main controller 171 compares the detected signal of the detector 165 with the pre-input ID code signal of the individual tire 113a, 113b, 113c and 113d and the sensors 131, 133 and 135, and confirms that the detected signal is the data of the tires 113a, 113b, 113c and 113d and the sensors 131, 133 and 135. At the same time, the monitoring unit 169 controls to display the confirmation result, compares the confirmed data of the sensors 131, 133 and 135 with a pre-input specified data of the corresponding sensor 131, 133 and 135, and controls to generate an alarm signal if the comparison result is out of an allowable range. The display 174 displays the confirmation result according to the signal of the main controller 171. The speaker 176 sounds an alarm according to the alarm signal of the main controller 171.

The main controller 171 includes a second internal memory (not shown) storing the ID code signal of the individual tires 113a, 113b, 113c and 113d and the sensors 131, 133 and 135 and the specified data of the individual sensor 131, 133 and 135.

The main controller 171 uses the data of the temperature sensor 133 and the acceleration sensor 135 among the confirmed data, for the compensation of temperature and acceleration characteristics of the pressure sensor 131.

In this exemplary embodiment, the self-powered sensing modules 115a, 115b, 115c and 115d are protected from the external shock and impact since the power conversion unit 125, the sensor unit 130, the transmission control unit 141, and the transmission output unit 145 are sealed in the power converter casing 125a, the sensor casing 130a, the transmission control unit casing 141a, and the transmission output unit casing 145a, respectively. Alternatively, these elements may be sealed in a single casing.

The self-powered sensing modules 115a, 115b, 115c and 115d according to an exemplary embodiment of the present invention is not limited to the TPMS for the vehicles, but may be applied to various devices in which a specific object deforms. For instance, the self-powered sensing module may be utilized in a safety diagnosis system installed at a bridge having severe vibrations due to running vehicles, thus measuring pressure, temperature, and acceleration. In this case, the self-powered sensing modules 115a, 115b, 115c and 115d may additionally include other sensors such as a humidity sensor.

The following descriptions are made on an operation of the TPMS employing the self-powered sensing modules 115a, 115b, 115c and 115d as constructed above in reference with FIGS. 4 through 9.

Referring to FIG. 7A, when rotating during the running of the vehicle, the tires 113a, 113b, 113c and 113d contract in contact with the road 170 and expand apart from the road 170 over again.

The piezoelectric thin film 123 of the power generator 121 of the individual self-powered sensing module 115a, 115b, 115c and 115d on the inner bottom 172 of the tires 113a, 113b, 113c and 113d, deforms in a certain angle θ in accordance with the tires 113a, 113b, 113c and 113d as shown in FIG. 7C just before and after the tires 113a, 113b, 113c and 113d contact with the road 170. After the tires 13a, 113b, 113c and 113d contact with the road 170, the piezoelectric thin film 123 becomes flat again as shown in FIG. 7B. When the tires 113a, 113b, 113c and 113d are spaced apart from the road 170, the piezoelectric thin film 123 bends as before.

As the piezoelectric thin film 123 repeats deforming and recovering, the first or second piezoelectric element 123a or 123b of the piezoelectric thin film 123 generates the electromotive force of the plus and minus polarities in alternation by the piezoelectric effect.

Accordingly, the generated electromotive force of the plus and minus polarities is applied to the AC/DC converter 126 of the power conversion unit 125 through the first and second connection terminals 123a and 123b and the wire 153.

The voltage applied from the power generator 121 is converted to the DC voltage in the AC/DC converter 126 and applied to the DC/DC converter 127.

The DC/DC converter 127 converts the applied DC voltage to the predetermined voltage and supplies to the parts of the self-powered sensing module 115a, 115b, 115c and 115d, specifically, to the sensors 131, 133 and 135 of the sensor unit 130, the transmission controller 143 of the transmitter unit 140, and the RF generator 146.

Then, the pressure sensor 131, the temperature sensor 133, and the acceleration sensor 135 detect the pressure, the temperature, and the acceleration in the tires 113a, 113b, 113c and 113d, respectively, and outputs the detected pressure, temperature, and acceleration signals. The first, second and third amplifiers 137, 138 and 139 amplify to a certain level the input pressure, temperature, and acceleration signals.

The transmission controller 143 outputs the first, second and third switching actuating signals to the switch operator 148 at the predetermined intervals. Hence, the switch operator 148 actuates the switch 144 by generating the switching signal depending on the first, second and third switching actuating signals.

The switch 144 outputs the signals input from the first, second and third amplifiers 137, 138 and 139 in sequence at the predetermined time intervals.

The A/D converter 142 converts to the digital signal the analog signal sequentially output from the switch 144 and outputs it to the transmission controller 143.

Upon receiving the digital signal from the A/D converter 142, the transmission controller 143 combines the digital signal with the ID code, which is pre-input or pre-stored to the first internal memory to distinguish the individual tire 113a, 113b, 113c and 113d and the signals of the sensors 131, 133 and 135, and outputs it in the predetermined data format.

The frequency generator 146 generates and outputs the predetermined carrier frequency to the RF generator 147. The RF generator 147 modulates the output data of the transmission controller 143 and emits the modulated data together with the carrier frequency of the frequency generator 146 as the radio wave through the transmission antenna 150.

The radio wave emitted from the RF generator 147 through the transmission antenna 150, is received over the reception antenna 161 and applied to the RF amplifier 163.

The RF amplifier 163 amplifies the received radio wave to the certain level and outputs the amplified signal to the detector 165. The detector 165 detects and outputs the amplified signal to the main controller 171.

Upon receiving the detected data signal from the detector 165, the main controller 171 compares the ID code signal, which is carried by the received signal and distinguishes the tires 113a, 113b, 113c and 113d and the signals of the sensors 131, 133 and 135, with the ID code signal data of the tires and the sensors pre-input or pre-stored in the second internal memory. Then, the main controller 171 confirms that the data of the received signal concerns one of the tires 113a, 113b, 113c and 113d and one of the sensors 131, 133 and 135, and stores in the second internal memory the confirmed data regarding the pressure, the temperature, and the acceleration.

Every time the data on the pressure, the temperature and the acceleration of the sensors 131, 133 and 135 of the individual tires 113a, 113b, 113c and 113d are stored in the second internal memory, the main controller 171 compensates for the pressure according to the temperature and the acceleration of the confirmed tire 113a, 113b, 113c or 113d and controls to update and display the temperature and/or the acceleration of the confirmed tire 113a, 113b, 113c or 113d and the compensated pressure.

The display 174 displays the temperature and/or the acceleration of the confirmed tire 113a, 113b, 113c or 113d and the compensated pressure according to the control signal of the main controller 171.

The main controller 171 compares the temperature and/or the acceleration of the confirmed tire 113a, 113b, 113c or 113d and the compensated pressure with data on specified pressure, temperature and/or acceleration pre-input or pre-stored in the second external memory. If the former is out of the allowable range of the latter, the main controller 171 controls to display abnormal state and generates the alarm signal. The display 174 displays the abnormal state according to the control signal of the main controller 171. The speaker 176 generates the alarm according to the alarm signal of the main controller 171.

The main controller 171 repeats to confirm the pressure, the temperature, and the acceleration with resect to the individual tire 113a, 113b, 113c and 113d during the rotation of the tires 113a, 113b, 113c and 113d, update and display the confirmed temperature and/or acceleration and the compensated pressure, compare with the specified data, and inform the vehicle operator of the abnormal state through the display 174 and the speaker 176.

In light of the forgoing, the self-powered sensing module and the TPMS using the same are powered by the power unit generating the power owing to the mechanical deformation without having to use the separate power supply. Hence, there is no need to replace the battery of the sensing module, and the maintenance cost reduces.

The TPMS employing the self-powered sensing module includes the power unit generating the power depending on the movement of the tires, that is, the running of the vehicle. Thus, there is no need to stall a separate vehicle movement sensor required for the control on the driving of the vehicle, and the manufacture cost of the vehicle reduces.

While the exemplary embodiments of the present invention have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the invention.

What is claimed is:

1. A tire pressure monitoring system (TPMS) for a vehicle comprising a plurality of tires, the TPMS comprising:
    a self-powered sensing module disposed in each tire to be deformed according to the rotation of the tire, comprising a sensor unit having at least one sensor for measuring at least one of a temperature, a pressure, and acceleration of the tires, a power unit generating a power by deforming mechanically according to the rotation of the tires and supplying the sensor with a power for actuation, and a transmitter unit transmitting data detected by the sensor; and
    a main unit disposed in the vehicle and comprising a receiver unit receiving the data transmitted from the transmitter unit and a monitoring unit displaying the received data to a vehicle operator;
    wherein the power unit comprises a piezoelectric power generator comprising a piezoelectric thin film; and
    wherein the piezoelectric thin film comprises a plurality of first and second piezoelectric elements disposed at certain intervals in alternation and polarized into an anode and a cathode.

2. The TPMS of claim 1, wherein the power unit further comprises:
    a power converter converting the power generated in the power generator to a power required for the sensor and the transmitter unit.

3. The TPMS of claim 1, wherein the piezoelectric generator further comprises:
    first and second electrodes formed on and below the piezoelectric thin film to face each other; and
    a flexible cover member attached on an outer surface of one of the first and second electrodes for flexibly supporting and protecting the piezoelectric thin film.

4. The TPMS of claim 3, wherein the piezoelectric thin film further comprises:
    a plurality of piezoelectric pads disposed between the first and second piezoelectric elements and separating the first and second piezoelectric elements from each other.

5. The TPMS of claim 2, wherein the power converter comprises:
    an AC/DC converter converting alternate current (AC) generated in the power generator to direct current (DC); and
    a DC/DC converter converting the DC converted in the AC/DC converter to the power required for the sensor and the transmitter unit.

6. The TPMS of claim 2, wherein the transmitter unit comprises:
    a transmission control unit amplifying a sensing signal output from the sensor to a certain level and outputting the amplified signal in a predetermined format at predetermined intervals; and
    a transmission output unit transmitting the data signal output from the transmission controller to the outside.

7. The TPMS of claim 6, wherein the transmission controller comprises:
    a sensing signal amplifier amplifying the sensing signal output from the sensor to the certain level;
    an analog-to-digital (A/D) converter converting an amplified analog signal of the sensing signal amplifier to a digital signal; and
    a transmission controller receiving the digital signal output from the A/D converter and outputting the received signal together with an identification (ID) code of a corresponding tire and the individual sensor in the predetermined data format at the predetermined time intervals.

8. The TPMS of claim 7, wherein the transmission output unit comprises:
    a frequency generator generating a predetermined carrier frequency; and
    a radio frequency (RF) generator modulating the data signal output from the transmission controller and emitting the modulated signal as a radio wave through a transmission antenna.

9. The TPMS of claim 6, wherein the receiver unit comprises:
    a reception amplifier amplifying the data signal transmitted from the transmitter unit in the predetermined data format, to a certain level; and
    a detector demodulating or detecting the data signal amplified in the reception amplifier and outputting the demodulated or detected signal.

10. The TPMS of claim 9, wherein the monitoring unit comprises:
    a main controller receiving the detected signal from the detector, confirming a corresponding tire and sensor by comparing the received signal with a pre-input ID code signal of the corresponding tire and sensor, and controlling to display a confirmation result; and
    a display displaying the confirmation result according to a control signal of the main controller.

11. The TPMS of claim 10, wherein the main controller compares the data of the confirmed sensor with a pre-input specified data of the sensor and controls to generate an alarm signal if the comparison result is out of an allowable range, and
    the monitoring unit further comprises a speaker for generating an alarm according to the alarm signal of the main controller.

12. The TPMS of claim 1, wherein the self-powered sensing module further comprises an elastic fixing member facilitating attachment onto an inner bottom of the tire.

13. A self-powered sensing module comprising:
   a sensor unit having at least one sensor for measuring at least one of a temperature, a pressure, and an acceleration of an object to be measured; and
   a power unit generating power by deforming mechanically according to an operation of the object and supplying the sensor with power required for actuating the sensor
   wherein the power unit comprises a piezoelectric power generator comprising a piezoelectric thin film;
   wherein the piezoelectric thin film comprises a plurality of first and second piezoelectric elements disposed at certain intervals in alternation and polarized into an anode and a cathode.

14. The self-powered sensing module of claim 13, wherein the power unit further comprises:
   a power converter converting the power generated in the power generator to a power required for the sensor.

15. The self-powered sensing module of claim 13, wherein the piezoelectric generator further comprises:
   first and second electrodes formed on and below the piezoelectric thin film to face each other; and
   a flexible cover member attached on an outer surface of at least one of the first and second electrodes for flexibly supporting and protecting the piezoelectric thin film.

16. The self-powered sensing module of claim 15, wherein the piezoelectric thin film further comprises:
   a plurality of piezoelectric pads disposed between the first and second piezoelectric elements and separating the first and second piezoelectric elements from each other.

17. The self-powered sensing module of claim 13, wherein the power converter comprises:
   an AC/DC converter converting alternating current (AC) generated in the power generator to direct current (DC); and
   a DC/DC converter converting the DC converted in the AC/DC converter to the power required for the sensor.

18. The self-powered sensing module of claim 14, further comprising a transmitter unit transmitting data measured by the sensor of the sensor unit to the outside.

19. The self-powered sensing module of claim 18, wherein the transmitter unit comprises:
   a transmission control unit amplifying a sensing signal output from the sensor to a certain level and outputting the amplified signal in a predetermined format at predetermined intervals; and
   a transmission output unit transmitting the data signal output from the transmission controller to the outside.

20. The self-powered sensing module of claim 19, wherein the transmission control unit comprises:
   a sensing signal amplifier amplifying the sensing signal output from the sensor to the certain level;
   an analog-to-digital (A/D) converter converting an amplified analog signal of the sensing signal amplifier to a digital signal; and
   a transmission controller receiving the digital signal output from the A/D converter and outputting the received signal together with an identification (ID) code of the individual tire and the individual sensor in the predetermined data format at the predetermined time intervals.

21. The self-powered sensing module of claim 19, wherein the transmission output unit comprises:
   a frequency generator generating a predetermined carrier frequency; and
   a radio frequency (RF) generator modulating the data signal output from the transmission controller and emitting the modulated signal as a radio wave through a transmission antenna.

22. The self-powered sensing module of claim 14, wherein the object measured by the sensor is a tire for a vehicle, and the self-powered sensing module is disposed on an inner bottom of the tire.

* * * * *